United States Patent
Galanti et al.

[11] Patent Number: 6,035,372
[45] Date of Patent: Mar. 7, 2000

[54] DYNAMIC RAM IN A MICROPROCESSOR SYSTEM

[75] Inventors: David Galanti, Natania; Eitan Zmora, Jerusalem; Avner Goren, Rosh-haayin, all of Israel

[73] Assignee: Motorola, Inc., Schaumburg, Ill.

[21] Appl. No.: 08/817,875

[22] PCT Filed: Dec. 20, 1996

[86] PCT No.: PCT/IB96/01499

§ 371 Date: Apr. 23, 1998

§ 102(e) Date: Apr. 23, 1998

[87] PCT Pub. No.: WO97/27547

PCT Pub. Date: Jul. 31, 1997

[30] Foreign Application Priority Data

Jan. 27, 1996 [GB] United Kingdom .................. 9601693

[51] Int. Cl.[7] ................................................. G06F 13/18
[52] U.S. Cl. .................... 711/106; 711/105; 711/152; 711/163; 711/164
[58] Field of Search ................................. 711/105, 106, 711/152, 163, 164, 154, 114, 167

[56] References Cited

U.S. PATENT DOCUMENTS

| | | | |
|---|---|---|---|
| 5,394,541 | 2/1995 | Chesley et al. | 711/107 |
| 5,448,742 | 9/1995 | Bhattacharya | 711/154 |
| 5,649,161 | 7/1997 | Andrade et al. | 711/167 |
| 5,737,744 | 4/1998 | Callison et al. | 711/114 |
| 5,873,114 | 2/1999 | Rahman et al. | 711/106 |

FOREIGN PATENT DOCUMENTS

| | | |
|---|---|---|
| 0183231 | 11/1985 | European Pat. Off. . |
| 0597307 | 10/1993 | European Pat. Off. . |

*Primary Examiner*—Eddie P. Chan
*Assistant Examiner*—Than Nguyen
*Attorney, Agent, or Firm*—Rennie W. Dover

[57] ABSTRACT

A microprocessor has RAS and CAS outputs for exclusive coupling, via a bus, to RAS and CAS inputs of a private DRAM. The microprocessor has a DRAM Control Register having at least one bit which is set to designate whether the DRAM is private to the microprocessor, a read circuit which reads the one bit and determines whether the bit is set, and a control logic circuit coupled to the read circuit for controlling functions of the microprocessor according to whether the DRAM is private to it.

4 Claims, 3 Drawing Sheets

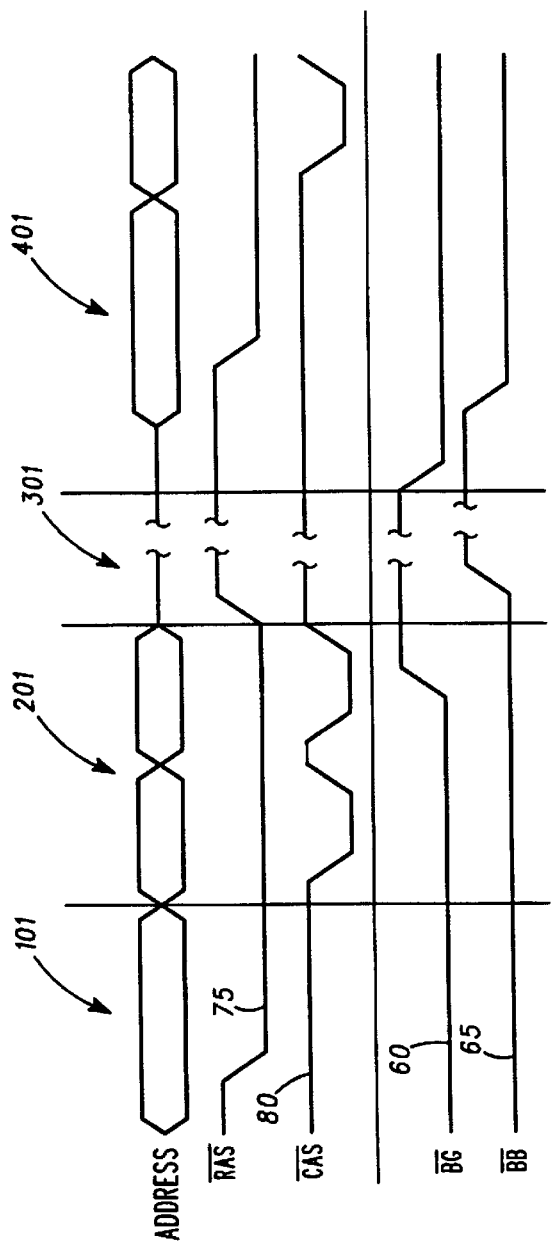
FIG. 3 —PRIOR ART—
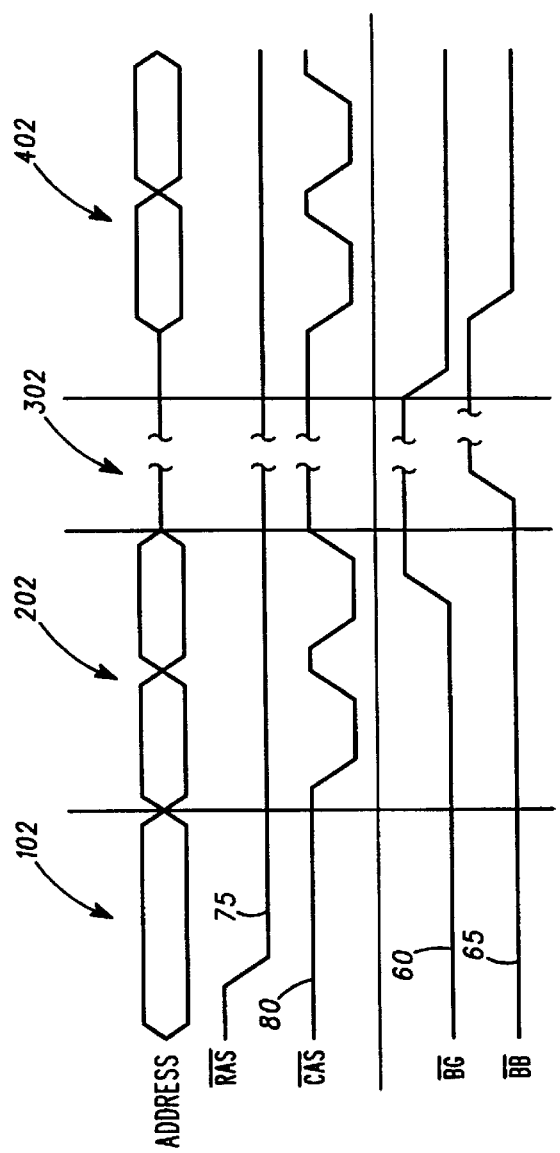
FIG. 4

6,035,372

DYNAMIC RAM IN A MICROPROCESSOR SYSTEM

FIELD OF THE INVENTION

This invention relates to microprocessors, and more particularly to microprocessors for use in systems with Dynamic Random Access Memories (DRAMs).

BACKGROUND OF THE INVENTION

In many known processing systems there are several processors, or other circuits which include a processing unit (hereinafter referred to as masters), which are coupled to a common bus so that they can all access various slave devices also coupled to the bus, such as various types of memory devices, e.g. DRAMs, Static Random Access Memories (SRAMs), Read Only Memories (ROMs), or other types of peripheral devices, e.g. storage devices or communications interfaces. In some instances, however, a particular DRAM is only ever accessed by a single master device, so that it can be considered proprietary or private to that one master device.

The DRAMs are provided with Row Access Strobe (RAS) and Column Access Strobe (CAS) line inputs which are used for addressing a particular memory cell by its row and column address for both reading the cell and writing to the cell. A feature of the use of the RAS and CAS lines for addressing is that the RAS input is used to designate a so-called page of the DRAM, while the CAS input designates a particular location or address within that page, so that, as long as successive cells to be addressed are within the same page (so-called fast page mode), only the CAS input need be changed and the RAS input can remain asserted but does not need to be read each time, thus shortening the access cycle. This can only happen, of course, as long as the same master device has control of the bus, so that it can be sure that no other master device has accessed another page of the DRAM in between two of its accesses. Thus, every time the master device gains bus control, it must address using both RAS and CAS lines (so-called out-of-page access), which involves more time.

Furthermore, as is well known, DRAMs need to be refreshed in order for them to maintain the data in their memory cells, and this can be done by enabling first the CAS input and then the RAS input, instead of the RAS input first followed by the CAS input, as is done for addressing. Such refreshing needs to be done regularly so that the master device which controls the refreshing must obtain bus control, perform the refreshing and then relinquish control of the bus. This uses up valuable bus time, which could have been used by other master devices.

The present invention therefore seeks to provide a microprocessor for use with a private DRAM which overcomes, or at least reduces the above-mentioned problems of the prior art. The term "microprocessor" hereafter is intended to include all master devices.

SUMMARY OF THE INVENTION

According to a first aspect of the present invention, there is provided a microprocessor having at least RAS and CAS outputs for exclusive coupling, via a bus, to RAS and CAS inputs of a private DRAM, the microprocessor comprising a DRAM Control Register having at least one bit which is set to designate whether the DRAM is private to the microprocessor, a read circuit which reads the one bit and determines whether the bit is set, and a control logic circuit coupled to the read circuit for controlling functions of the microprocessor according to whether the DRAM is private to it.

In one embodiment, the control logic circuit controls a DRAM refresh function of the microprocessor such that the microprocessor performs the DRAM refresh function using the RAS and CAS outputs without issuing a request for, nor assuming, control of the bus, when the one bit is set to indicate that the DRAM is private.

In another embodiment, the control logic circuit controls a DRAM addressing function of the microprocessor to allow the microprocessor to relinquish control of the bus without releasing the RAS and CAS lines, thereby allowing fast page mode access to the DRAM the next time the microprocessor has control of the bus, when the one bit is set to indicate that the DRAM is private.

According to a second aspect of the present invention, there is provided a system comprising a microprocessor having address, control, data, RAS and CAS pins respectively coupled to address, control, data, RAS and CAS lines of a bus, at least one DRAM having address, control, data, RAS and CAS pins respectively coupled to the address, control, data, RAS and CAS lines of the bus, the DRAM being private to the microprocessor and the RAS and CAS pins of the DRAM and the microprocessor being logically tied together so that the microprocessor cannot access any other DRAM and the DRAM cannot be accessed by any other microprocessor, the microprocessor comprising a DRAM Control Register having at least one bit which is set to designate that the DRAM is private to the microprocessor, a read circuit which reads the one bit and determines whether the bit is set, and a control logic circuit coupled to the read circuit, the control logic circuit controlling a DRAM refresh function of the microprocessor such that the microprocessor performs the DRAM refresh function using the RAS and CAS lines of the bus without issuing a request for, nor assuming, control of the bus, when the bit is set, and the control logic circuit controlling a DRAM addressing function of the microprocessor, when the bit is set to allow the microprocessor, if desired, to relinquish control of the bus without releasing the RAS and CAS lines, thereby allowing in-page access to the DRAM the next time the microprocessor has control of the bus.

In this way, the DRAM is able to be refreshed while the processor is not the bus master, and may be accessed in fast 'page mode' immediately after gaining mastership, without the need to drive row address on the address bus, and to assert RAS before.

BRIEF DESCRIPTION OF THE DRAWINGS

One embodiment of the invention will now be more fully described, by way of example, with reference to the drawings, in which:

FIG. 3 shows a timing diagram for a prior art addressing function of a processor and DRAM;

FIG. 4 shows a timing diagram for a fast page mode addressing function for the processor and DRAM of FIG. 1.

DETAILED DESCRIPTION OF A PREFERRED EMBODIMENT

Figure 1:
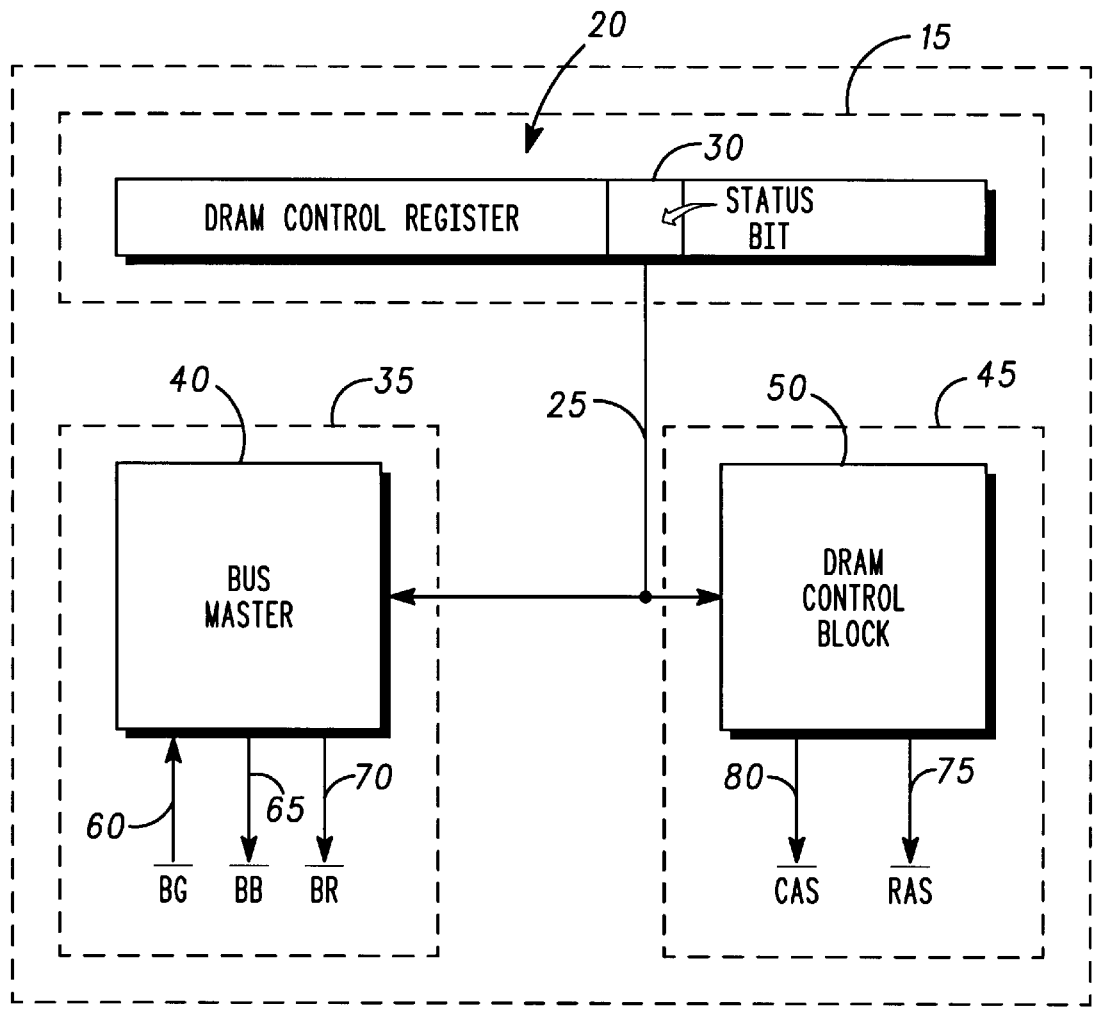
FIG. 1 shows a processor and DRAM arrangement according to the invention.

Referring to FIG. 1, there is shown a processor and DRAM arrangement 10. A processor 15 comprises a programmable register 20, which is termed DCR (DRAM Control Register). The DCR 20 contains a status bit 30. The processor is coupled to various other devices via a bus 25. The bus 25 includes a bus grant (BG) line, a bus busy (BB) line and a bus request (BR) line, and is managed by an arbitrator (not shown).

A bus master 35 of the arrangement, is coupled to the bus 25 and includes a bus control block 40, which provides control of the bus. A DRAM 45 is also coupled to the bus 25 and includes a DRAM control block 50, which provides control of the DRAM 45. The DRAM 45 has RAS and CAS lines (not shown). If the status bit 30 of the DCR 20 is set, then the DRAM 45 is effectively private to the processor 15, and the RAS and CAS lines are driven exclusively by the processor 15.

The bus control block 40 includes a bus grant (BG) input 60, a bus busy (BB) output 65 and a bus request (BR) 70 output coupled to the respective lines of the bus 25. The DRAM control block has outputs CAS 80 and RAS 75, to control the CAS and RAS lines of the DRAM 45. The status bit 30 of the DCR 20 is arranged to be read in parallel by the bus control block 40 and the DRAM control block 50, via the bus 25.

Figure 2:
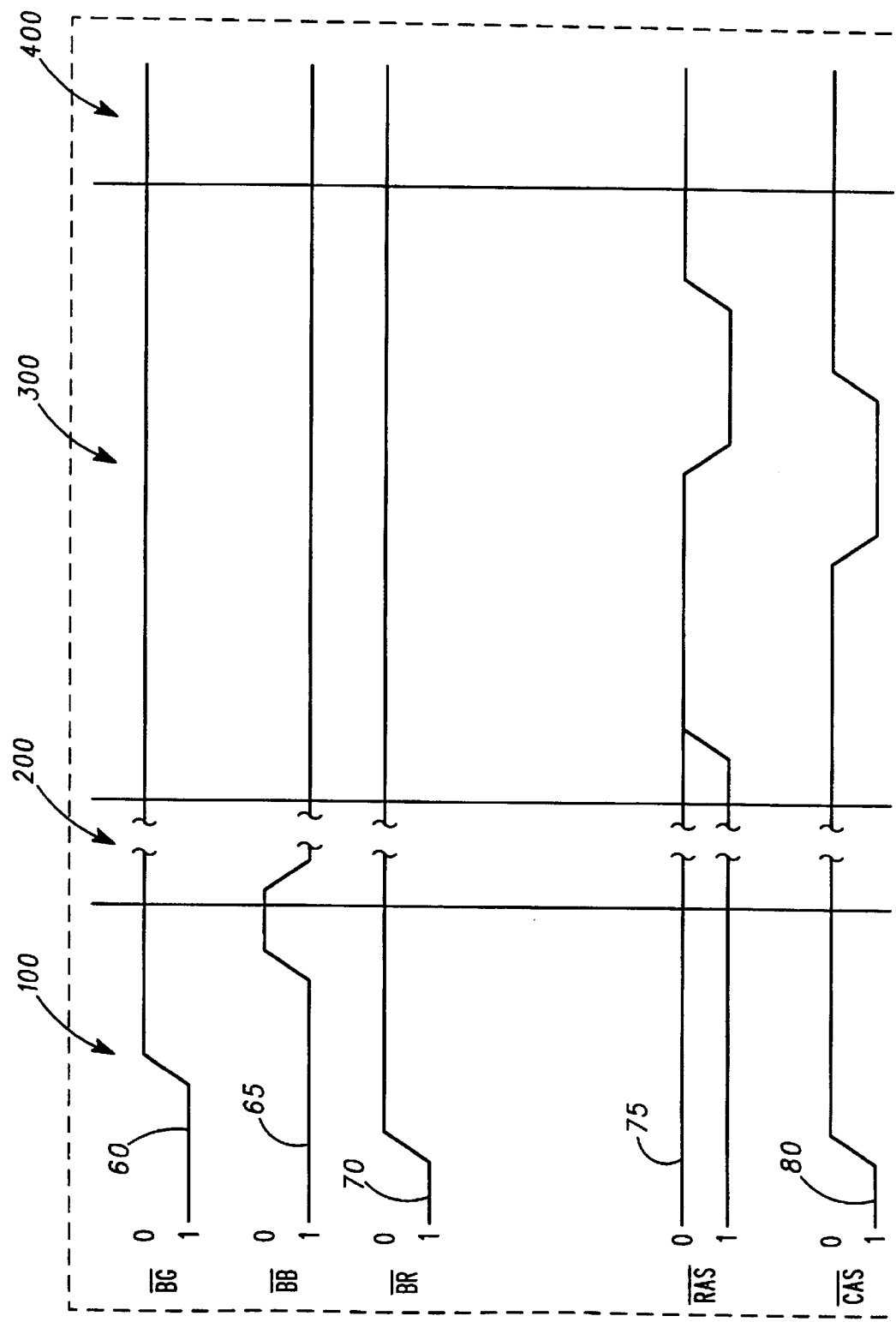
FIG. 2 shows a timing diagram for a refresh function for the processor and DRAM of FIG. 1.

In operation, and referring now also to FIG. 2, there is shown a refresh sequence, which does not require mastership of the bus 25 by the processor 15. All control lines shown are pull-up (logical 1=low voltage level).

Section 100 shows the bus release in which BR 70 is negated at the end of bus activity, BG 60 is negated by the arbitrator, and as a result BB 65 is negated by the processor 15. After the negation of BB 65, in section 200, all the processor 15 outputs become tristate (floating). Another processor (not shown) becomes master of the bus 25, and it asserts BB 65 to signal its mastership. If the bit 30 is set in the DCR 20, the RAS 75 and CAS 80 lines continue to be driven by the processor 15, and do not become tristate.

In section 300 the DRAM control block 50 keeps driving the RAS line 75 asserted, when mastership is lost, as it was asserted before. Then the DRAM control block 50 starts the refresh operation (driving CAS 80 before RAS 75) immediately as the need is detected, the control block 40 controlling a DRAM refresh function of the processor 15 such that the processor 15 performs the DRAM refresh function using the RAS 75 and CAS 80 lines of the bus 25 without issuing a request for, nor assuming, control of the bus 25. The refresh is performed by asserting CAS 80 before RAS 75.

In contrast a prior art arrangement requests mastership of the bus when the need to refresh the external DRAM is detected. Mastership has then to be granted before the actual refresh starts. This is also the case if the status bit 30 is not set.

Referring now also to FIG. 3 and FIG. 4, there is shown the possibility to do first access of the DRAM 45 after mastership is gained, as 'page mode' access. Sections 101, 201, 301 and 401 of FIG. 3 represent stages in a prior art arrangement. Sections 102, 202, 302 and 402 of FIG. 4 represent stages found in the 'page mode' access.

In sections 101 and 102 the row address is driven, and RAS 75 is asserted. In sections 201 and 202 two column addresses are driven one after the other, and CAS 80 is asserted and negated accordingly. Near the end of this period BG 60 is negated to signal that bus mastership is lost by the processor 15.

If the status bit 30 of the DCR 20 is set, then in section 302 the bus 25 is released, RAS 75 is kept driven active and CAS 80 is kept driven negated. In a prior art arrangement as shown in section 301 RAS 75 is first negated, then tristated, CAS 80, being already negated, and now tristated.

In time period 402 the bus mastership is owned again by the processor 15, which starts immediately with column address driving, followed by CAS 80 assertion, and so on, thus the access time of the first access is much shorter.

In contrast, a prior art DRAM control block performs a complete access routine, as shown in section 401, with all the needed stages, row address driving, RAS assertion, column address driving, GAS assertion, etc. Again, this is also the case if the status bit 30 is not set.

It will be appreciated that although only one particular embodiment of the invention has been described in detail, various modifications and improvements can be made by a person skilled in the art without departing from the scope of the present invention.

We claim:

1. A microprocessor to operate in an environment of multiple processors sharing a common bus, said microprocessor having at least RAS and CAS outputs for exclusive coupling, via said common bus, to RAS and CAS inputs of a private DRAM, the microprocessor comprising a DRAM Control Register having at least one bit which is set to designate whether the DRAM is private to the microprocessor, a read circuit which reads the one bit and determines whether the bit is set, and a control logic circuit coupled to the read circuit for controlling functions of the microprocessor according to whether the DRAM is private to it such that in case the DRAM is private to the microprocessor, the microprocessor keeps the status of the RAS and CAS outputs even if the microprocessor releases the common bus.

2. The microprocessor of claim 1, wherein the control logic circuit controls a DRAM refresh function of the microprocessor such that the microprocessor performs the DRAM refresh function using the RAS and CAS outputs without issuing a request for, nor assuming, control of the bus, when the one bit is set to indicate that the DRAM is private.

3. A microprocessor having at least RAS and CAS outputs for exclusive coupling, via a bus, to RAS and CAS inputs of a private DRAM, the microprocessor comprising a DRAM Control Register having at least one bit which is set to designate whether the DRAM is private to the microprocessor, a read circuit which reads the one bit and determines whether the bit is set, and a control logic circuit coupled to the read circuit for controlling functions of the microprocessor according to whether the DRAM is private to it, said control logic circuit controlling a DRAM addressing function of the microprocessor to allow the microprocessor to relinquish control of the bus without releasing the RAS and CAS lines, thereby allowing fast page mode access to the DRAM the next time the microprocessor has control of the bus, when the one bit is set to indicate that the DRAM is private.

4. A microprocessor system comprising:

a microprocessor having address, control, data, RAS and CAS pins respectively coupled to address, control, data, RAS and CAS lines of a bus; at least one DRAM having address, control, data, RAS and CAS pins respectively coupled to the address, control, data, RAS and CAS lines of the bus, the DRAM being private to the microprocessor and the RAS and CAS pins of the DRAM and the microprocessor being logically tied together so that the microprocessor cannot access any other DRAM and the DRAM cannot be accessed by any other microprocessor;

wherein the microprocessor comprises a DRAM Control Register having at least one bit which is set to designate that the DRAM is private to the microprocessor, a read circuit which reads the one bit and determines whether the bit is set, and a control logic circuit coupled to the read circuit, the control logic circuit controlling a DRAM refresh function of the microprocessor such that the microprocessor performs the DRAM refresh function using the RAS and CAS lines of the bus without issuing a request for, nor assuming, control of the bus, when the bit is set, and the control logic circuit controlling a DRAM addressing function of the microprocessor, when the bit is set to allow the microprocessor, if desired, to relinquish control of the bus without releasing the RAS and CAS lines, thereby allowing in-page access to the DRAM the next time the microprocessor has control of the bus.

* * * * *